(12) United States Patent
Zhang et al.

(10) Patent No.: US 9,739,919 B2
(45) Date of Patent: Aug. 22, 2017

(54) POLARIZER AND FABRICATION METHOD THEREOF

(71) Applicants: Xiamen Tianma Micro-electronics Co., Ltd., Xiamen (CN); Tianma Micro-electronics Co., Ltd., Shenzhen (CN)

(72) Inventors: Long Zhang, Xiamen (CN); Poping Shen, Xiamen (CN); Ting Zhou, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/006,091

(22) Filed: Jan. 25, 2016

(65) Prior Publication Data
US 2016/0238765 A1    Aug. 18, 2016

(30) Foreign Application Priority Data
Feb. 13, 2015    (CN) .......................... 2015 1 0076442

(51) Int. Cl.
*G02B 5/30*    (2006.01)
*G02B 27/28*    (2006.01)
*C03C 17/28*    (2006.01)

(52) U.S. Cl.
CPC .............. *G02B 5/305* (2013.01); *C03C 17/28* (2013.01)

(58) Field of Classification Search
CPC ... G02F 2001/133635; G02F 1/133528; G02F 2001/133531; H01L 51/5293; G02B 5/30
USPC ........................................ 359/483.01–494.01
See application file for complete search history.

(56) References Cited

U.S. PATENT DOCUMENTS

| | | | |
|---|---|---|---|
| 6,072,629 A | 6/2000 | Fan et al. | |
| 6,303,056 B1* | 10/2001 | Fan .................. | B82Y 30/00 252/299.01 |
| 2004/0144754 A1* | 7/2004 | Itami ................. | G02F 1/133553 216/62 |
| 2010/0045901 A1* | 2/2010 | Uehira ................ | C07D 277/64 349/75 |
| 2012/0162766 A1* | 6/2012 | Lee ..................... | G02B 5/3016 359/486.01 |
| 2013/0222721 A1* | 8/2013 | Kim .................... | G02B 27/26 349/15 |

FOREIGN PATENT DOCUMENTS

| | | |
|---|---|---|
| CN | 1339715 A | 3/2002 |
| CN | 103048725 A | 4/2013 |
| CN | 104271707 A | 1/2015 |
| JP | 5773023 B2 | 9/2015 |

* cited by examiner

*Primary Examiner* — Bumsuk Won
*Assistant Examiner* — Tamara Y Washington
(74) *Attorney, Agent, or Firm* — Anova Law Group, PLLC

(57) ABSTRACT

The present disclosure provides a polarizer and fabrication method thereof. The polarizer includes a substrate made of transparent material and a first polarizing layer formed on the substrate having an optical alignment direction after being exposed to a polarized ultraviolet light. The substrate is the only substrate in the polarizer, and no additional substrate is configured on the polarizing layer.

19 Claims, 5 Drawing Sheets

POLARIZER AND FABRICATION METHOD THEREOF

CROSS-REFERENCES TO RELATED APPLICATIONS

This application claims the priority of Chinese Patent Application No. CN201510076442.9, filed on Feb. 13, 2015, the entire contents of which are incorporated herein by reference.

FIELD OF THE DISCLOSURE

The present disclosure generally relates to the field of optical component technologies and, more particularly, relates to a polarizer and a fabrication method thereof.

BACKGROUND

Polarizer, also known as PL lens, is a type of color filter. The primary function of a polarizer is to selectively pass light with a certain polarization direction. Polarizers are frequently used in color photography or black-and-white photography to eliminate or reduce bright light reflected by non-metal surfaces and hence to remove or reduce bright spots. For example, in the scenery and landscape photography, polarizers are used to show the object texture in a bright reflection area, to highlight the scene behind glass, and to darken sky and to show blue sky and white clouds, etc. Based on the principle for filtering polarized light, polarizers may be divided into two types, circular polarizers (CPL) and linear polarizers (LPL).

One example of a polarizer is a slice of directional micro-polarizing crystal (such as mica) laminated between two pieces of optical glass. Another example of a polarizer is to coat the optical glass with a crystal material such as a polyethylene film or a polyethylene cyanide film. Such polymer coating produces a fine grating structure, like a fine fence, only passing light with a polarization direction same as the slit direction of the grating structure. The two pieces of glass are mounted independently on a rotatable ring, and rotating one of the two glass may eliminate polarized light reflected from the surface of the photographed object. However, as time goes by, the polymer coating gradually gets aged and loses the polarizing function. In addition, moisture, shock, and vibration also shorten its lifespan.

The disclosed polarizer and fabrication method are directed to solve one or more problems in the art.

BRIEF SUMMARY OF THE DISCLOSURE

Directed to solve one or more problems set forth above and other problems in the art, the present disclosure provides a polarizer and a fabrication method to improve the image quality and to reduce the production cost.

One aspect of the present disclosure includes a polarizer. The polarizer includes a substrate made of a transparent material, and a first polarizing layer formed on the substrate having an optical alignment direction after being exposed to a polarized ultraviolet light. The substrate is the only substrate in the polarizer, and no additional substrate is configured on the polarizing layer.

Another aspect of the present disclosure provides a method of fabricating the polarizer. The fabrication method includes the following steps. A substrate is provided. A first polarizing layer is formed on the substrate. The first polarizing layer is pre-baked including at least a first region and a second region. A polarized ultraviolet light is irradiated on the first polarizing layer. The first region and the second region are irradiated by the polarized ultraviolet light with different polarization directions. The first polarizing layer on the substrate is cured to form the polarizer without adding any additional substrate on the first polarizing layer.

Another aspect of the present disclosure provides an optical component. The optical component includes a plurality of lenses containing the disclosed polarizer.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention.

Figure 1:
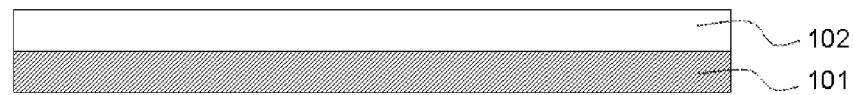
FIG. 1 illustrates a schematic view of an exemplary polarizer according to the disclosed embodiments.

FIG. 1 illustrates a schematic view of an exemplary polarizer according to the present disclosure. Referring to FIG. 1, the polarizer may include a substrate 101 made of transparent material. The substrate 101 may be made of a rigid material with a Mohs hardness greater than 6. In one embodiment, the substrate 101 may be made of glass. A polarizing layer 102 may be formed on the substrate 101. The polarizing layer 102 may be irradiated by a polarized ultraviolet light to obtain an alignment direction.

Figure 2:
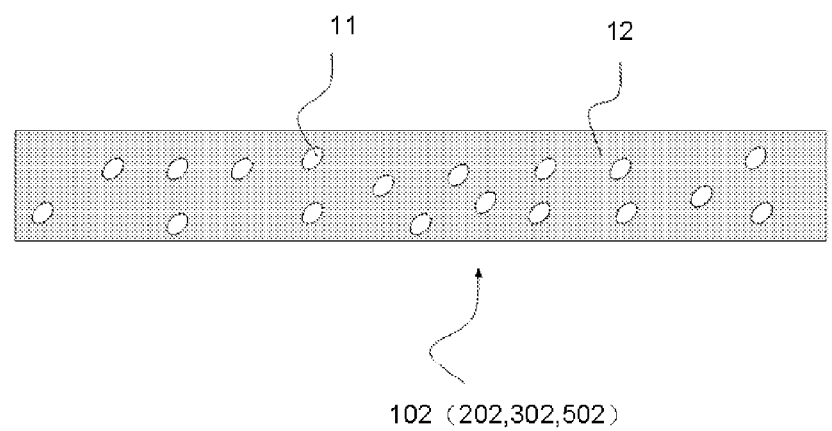
FIG. 2 illustrates a schematic view of an exemplary polarizing material according to the disclosed embodiments.

FIG. 2 illustrates a schematic view of an exemplary polarizing material according to the present disclosure. Referring to FIG. 2, the polarizing layer 102 may include a base material 12 and a polarizing material 11. The polarizing material 11 may be mixed or doped into the base material 12.

For example, the polarizing material 11 may be a dichroic organic dye. The dichroic organic dye may be a mixture of one or more of azo dye, anthraquinone dye, biphenyl dye, triphenylmethane diazinon dye and derivatives, single methine or multiple methine dye, polycyclic dye, and benzene ethylene dye, etc. The polarizing material 11 may have a dichroic ratio greater than 7. The base material 12 may be a mixture of one or more of cellulose triacetate, polyimide, polyamic acid, polystyrenes, cellulose derivatives, polyvinyl chloride, polypropylene, acrylic polymers, polyamides, polyesters, and ethylene-vinyl acetate copolymer saponified, etc.

Further, at least one of the polarizing material 11 and the base material 12 may have the optical alignment feature. For example, when the polarizing material 11 is an azo dye or a benzene ethylene dye, the polarizing material 11 may have the optical alignment feature. When the base material 12 is a thietanyl-based polyimide, an azo-based optical alignment material, or a poly-cinnamoyl derivative based optical alignment material, the base material 12 may have the optical alignment feature.

Further, after a prebaking process is performed on the polarizing layer 102, the polarizing layer 102 may be irradiated by a polarized ultraviolet light to obtain an alignment direction for the polarizing layer 102. That is, the polarizing material 11 and/or the base material 12 can be aligned by the polarized ultraviolet light because the polarizing material 11 and/or the base material 12 are dichroic optical alignment material. Finally, the polarizing layer 102 on the substrate 101 may be cured with high temperature baking to form a polarizer.

Thus, unlike conventional polarizers which are fabricated by placing a polarizing layer between two pieces of glass, the disclosed polarizer only uses a single piece of glass and a polarizing layer. That is, because the optical alignment process is used, after the polarizing layer 102 is formed on a glass substrate 101, another glass substrate is not needed to cover the polarizing layer 102. Thus, the overall thickness and weight of the polarizer may be reduced.

Optionally, both the base material 12 and the polarizing material 11 may support the optical alignment feature. When being irradiated by a polarized ultraviolet light, the polarizing material 11 may obtain an alignment direction aligned with the polarization direction of the polarized ultraviolet light. At the same time, the base material 12 may obtain the same alignment direction aligned with the polarization direction of the polarized ultraviolet light. The base material 12 may be a polymer material, and the polarizing material 11 may be a small-molecule material. In the optical alignment process, the base material 12 may provide a driving effect to the alignment of the polarizing material 11, and the polarizing material 11 may provide a supporting effect to the alignment of the based material 12. As a result, both the polarizing material 11 and the base material 12 may obtain the same alignment direction more precisely.

Further, the polarizing layer 102 may be a regionalized polarizing layer, i.e., including different regions having different polarization directions. In such case, each region of the polarizer may obtain the polarization direction more precisely to the design specification. Thus, the polarizer according to the present disclosure may achieve the desired regionalization precision and stability.

Further, in one embodiment, the base material 12 may be polyimide. Polyimide is superior to the widely used polyvinyl alcohol in terms of the tolerance to high temperature and high humidity environment. Thus, the polarizing layer 102 made of polyimide is more reliable. And polyimide makes the polarizing layer 102 thinner than polyvinyl alcohol does. Thus, the overall thickness of the polarizer may be further reduced.

Figure 3:
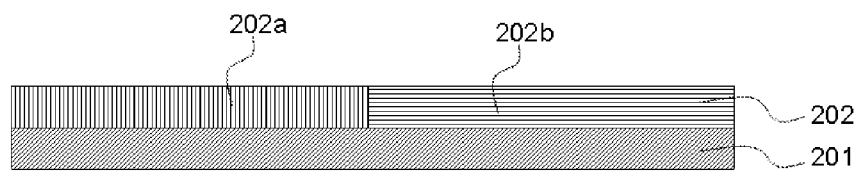
FIG. 3 illustrates a schematic view of another exemplary polarizer according to the disclosed embodiments.

FIG. 3 illustrates a schematic view of another exemplary polarizer according to the present disclosure. Referring to FIG. 3, the polarizer may include a substrate 201. The substrate 201 may be made of glass. A polarizing layer 202 may be formed on the substrate 201. The polarizing layer 202 may be irradiated by a polarized ultraviolet light to obtain an alignment direction. The polarizing layer 202 may be made of materials described in the previous embodiments. In one embodiment, the polarizing layer 202 may include at least a first region 202*a* and a second region 202*b*. The first region 202*a* and the second region 202*b* may have different polarization axis directions.

In one embodiment, an optical alignment process may be used to irradiate a polarized ultraviolet light on the polarizing layer 202 to obtain an alignment direction. Then, the polarizing layer 202 may be cured by high temperature baking. Because the alignment direction determines the polarization direction of the polarizer, the different regions on the polarizing layer 202 may be irradiated by the ultraviolet light with different polarization directions to obtain different polarization directions in different regions of the polarizing layer 202.

Thus, the polarizer according to the present disclosure may include at least a first region 202*a* and a second region 202*b*. The first region 202*a* and the second region 202*b* may have different polarization axis directions. Further, the polarizer may include more than two regions. Each of these regions may have a polarization direction different from the polarization directions of any other regions. Alternatively, depending on the applications, certain regions may have same polarization direction, and certain other regions may have polarization directions different from each other. This type of polarizers may be called regionalized polarizers in the present disclosure.

The polarizer according to the present disclosure eliminates an additional glass substrate and, in the meantime, regionalizes the polarization directions. When a light passes through the said polarizer, the light may be polarized in different polarization directions in different regions. In practical applications, the disclosed polarizer may be used in cameras, microscopes, laser devices, and other suitable optical components. The regionalized polarizer according to the present disclosure may allow a viewer to observe different views in different regions.

For example, a sample under a microscope may have different types of interference light and different intensities of interference light in different regions. The regionalized polarizer may effectively filter out different interference light in different regions simultaneously without affecting the regions absent of the interference light. Thus, more clear and even display images can be realized, improving display quality.

Figure 4:
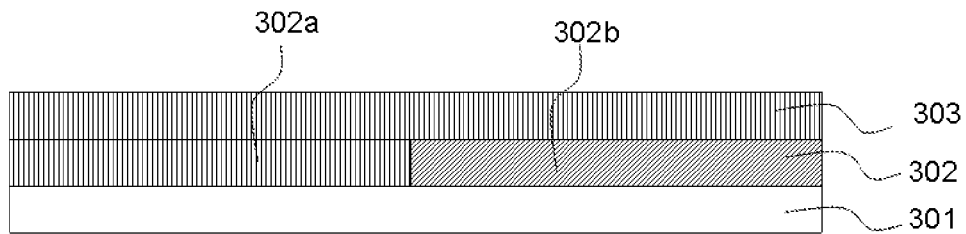
FIG. 4 illustrates a schematic view of another exemplary polarizer according to the disclosed embodiments.

FIG. 4 illustrates a schematic view of another exemplary polarizer according to the present disclosure. Referring to FIG. 4, the polarizer may include a substrate 301. The substrate 301 may be made of glass. A first polarizing layer 302 may be formed on the substrate 301. The first polarizing layer 302 may be irradiated by a polarized ultraviolet light to obtain an alignment direction.

Further, a second polarizing layer 303 may be formed on the first polarizing layer 302. The first polarizing layer 302 and the second polarizing layer 303 may be made of materials described in the previous embodiments. In one embodiment, the first polarizing layer 302 may include at least a first region 302a and a second region 302b. The first region 302a and the second region 302b may have different polarization axis directions. The second polarizing layer 303 may have a polarization axis direction different from the polarization axis direction of at least one region of the first polarizing layer 302.

The polarizer according to the present disclosure may be used to adjust the brightness of the light passing through the polarizer. Referring again to FIG. 4, in one example, a natural light may enter the polarizer from the bottom of the substrate 301 with an initial intensity at about 100%.

After the natural light passes through the first polarizing layer 302, the light intensity may be reduced to about 50% in the first region 302a, and the light may have a horizontal polarization direction. Accordingly, the light intensity may be reduced to about 50% in the second region 302b, and the light may have an about 45° polarization direction. The second polarizing layer 303 may have a polarization direction paralleled with the polarization direction in the first region 302a of the first polarizing layer 302.

After the light exits the first region 302a and passes through the second polarizing layer 303, the light may have about 50% intensity and may have the same horizontal polarization direction. In the meantime, after the light exits the second region 302b and passes through the second polarizing layer 303, the light may only have a horizontal portion of the about 45° polarized light and may have about 35% intensity. The light may have a horizontal polarization direction. Thus, the regionalized polarizer illustrated in this example may be used to adjust the light transmittance in different regions of the regionalized polarizer.

In another example, a sample under a microscope may have different interference light intensities, different interference severities, and different interference light types in different regions. The regionalized polarizer may be used to filter out different interference light in different regions without affecting the normal function light. Further, the regionalized polarizer may be able to smooth out the bright spots and to provide more uniform brightness across the entire view image. Optionally, the first region and the second region may have same exiting light intensity. Such configuration may provide more uniform brightness across the entire view image, facilitating observing and processing images.

Figure 5:
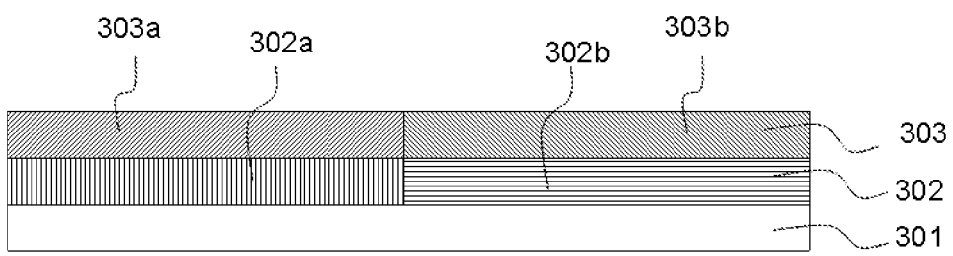
FIG. 5 illustrates a schematic view of another exemplary polarizer according to the disclosed embodiments.

Optionally, the second polarizing layer 303 may have a third region 303a and a fourth region 303b. FIG. 5 illustrates a schematic view of another exemplary polarizer according to the present disclosure. Referring to FIG. 5, the third region 303a may correspond to the first region 302a, and the fourth region 303b may correspond to the second region 302b. The third region 303a and the fourth region 303b may have different polarization axis directions. The first region 302a, the second region 302b, the third region 303a, and the fourth region 303b may also have different polarization axis directions. Such configurations may allow more flexible adjustments of wider light intensity range for each region.

Figure 6:
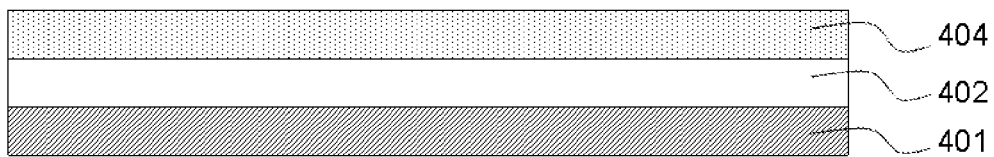
FIG. 6 illustrates a schematic view of another exemplary polarizer according to the disclosed embodiments.

FIG. 6 illustrates a schematic view of another exemplary polarizer according to the present disclosure. Referring to FIG. 6, the polarizer may include a substrate 401. The substrate 401 may be made of glass. A first polarizing layer 402 may be formed on the substrate 401. The first polarizing layer 402 may be irradiated by a polarized ultraviolet light to obtain an alignment direction. The first polarizing layer 402 may be made of materials described in the previous embodiments.

Further, a quarter-wavelength thin film 404 may be formed on the first polarizing layer 402. When a light passes through the quarter-wavelength thin film 404, the polarization of the light may be circularly rotated, causing a $\pi/2$ phase shift to the electric field vector in one direction (or x direction), but causing no effect to the electric field vector in another direction (y direction) which is perpendicular to the x direction. When a polarized light passes through the quarter-wavelength thin film along the bisecting line of the angle formed by x and y directions or at a $\pi/4$ angle to the optical axis of the quarter-wavelength thin film, a result polarized light that have two polarization directions perpendicular to each other and two electric field vector phases apart by $\pi/2$ may be obtained, so-called circularly polarized light. The polarizer is also called a circular polarizer.

The circular polarizer may filter out undesired polarized light and may convert the polarized incident light into the unpolarized exiting light and, thus, is widely used in photography. In the existing technology, a polarizing layer is laminated between two pieces of glass and, then, a quarter-wavelength thin film is coated over one of the two glass pieces to form a circular polarizer. In the present disclosure, because the optical alignment process is used, a polarizing layer may be formed on a glass substrate, and a quarter-wavelength thin film may be formed on the polarizing layer to form a circular polarizer. No additional glass substrate is needed to cover the polarizing layer. Thus, the overall thickness and weight of the polarizer may be reduced.

The quarter-wavelength thin film may have a thickness $d=\frac{1}{4}\lambda k$, wherein $\lambda$ is the wavelength of the incidental light, k is a constant, and $0 \leq k \leq 1$. Optionally, $0.6 \leq k \leq 0.9$. The quarter-wavelength thin film may have a thickness approximately between 28 nm and 100 nm. Optionally, the quarter-wavelength thin film may have a thickness approximately between 47 nm and 100 nm, which may have a desired effect.

Figure 7:
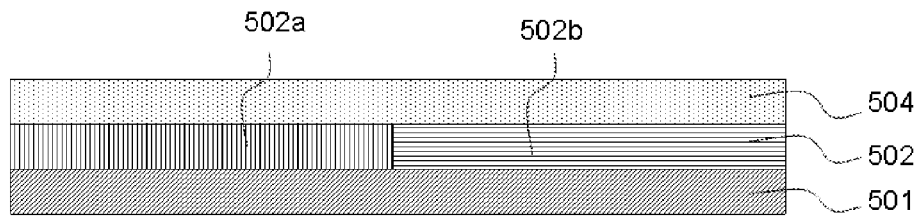
FIG. 7 illustrates a schematic view of another exemplary polarizer according to the disclosed embodiments.

FIG. 7 illustrates a schematic view of another exemplary polarizer according to the present disclosure. Referring to FIG. 7, the polarizer may include a substrate 501. The substrate may be made of glass. A polarizing layer 502 may be formed on the substrate 501. The polarizing layer 502 may be irradiated by a polarized ultraviolet light to obtain an alignment direction. The polarizing layer 502 may be made of materials described in the previous embodiments. The polarizing layer 502 may include at least a first region 502a and a second region 502b, and the first region 502a and the second region 502b may have different polarization axis directions. A quarter-wavelength thin film 504 may be formed on the polarizing layer 502 to form a circular polarizer.

Although a general purpose circular polarizer may be able to convert a polarized light into an unpolarized light, such unpolarized light is a circularly polarized light. At any moment, the circularly polarized light oscillates in a unique direction, while Natural light oscillates in all directions. For example, unlike natural light, the circularly polarized light may be a left-handed circularly polarized light or a right-handed circularly polarized light. The polarizer according to the present disclosure may convert a polarized light into an unpolarized light that oscillates in all directions at any moment, because the different polarization directions provided by the plurality of regions having different polarization axis directions. Such unpolarized light may be similar to natural light. For example, the circular polarizer may be used in the camera lenses to sense the light more precisely to minimize the interference light effect on the auto-exposure and auto-focus functions.

Figure 8A:
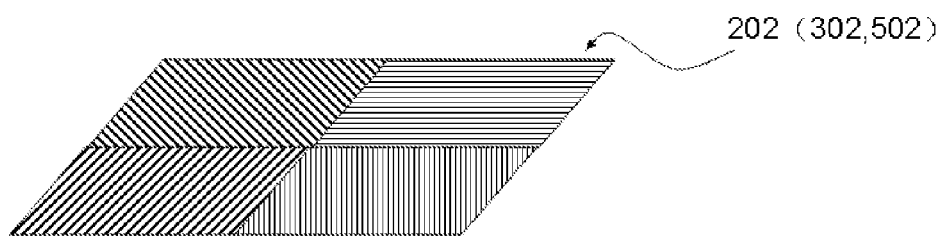
FIG. 8a illustrates a schematic view of another exemplary polarizer according to the disclosed embodiments.

Further, the regionalized polarizer may be configured with a plurality of polarization directions distributed over a plurality of regions. FIG. 8a illustrates a schematic view of another exemplary polarizer according to the present disclosure. Referring to FIG. 8a, the polarizer may include a plurality of regions. Each region of the polarizing layer 202, 302, or 502 may have a polarization direction different from polarization directions in other regions.

Figure 8B:
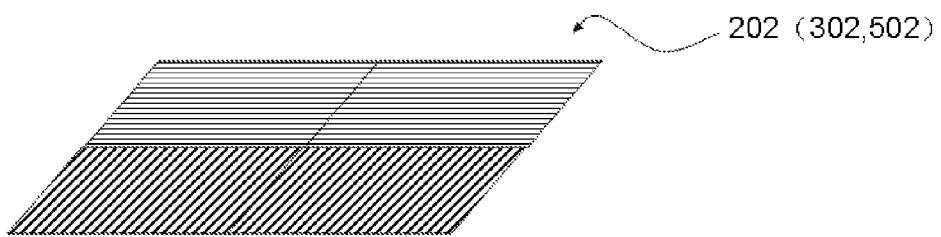
FIG. 8b illustrates a schematic view of another exemplary polarizer according to the disclosed embodiments.

FIG. 8b illustrates a schematic view of another exemplary polarizer according to the present disclosure. Referring to FIG. 8b, the polarizer may include a plurality of regions. Each region of the polarizing layer 202, 302, or 502 may include one entire row of regions that have one polarization direction. Each row of regions may have a polarization direction different from polarization directions in other rows of regions.

Figure 8C:
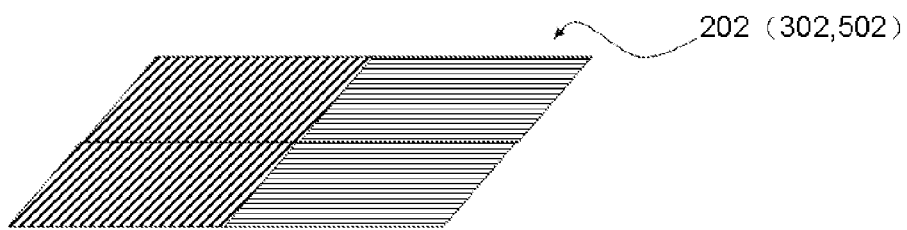
FIG. 8c illustrates a schematic view of another exemplary polarizer according to the disclosed embodiments.

FIG. 8c illustrates a schematic view of another exemplary polarizer according to the present disclosure. Referring to FIG. 8c, the polarizer may include a plurality of regions. Each region of the polarizing layer 202, 302, or 502 may include one entire column of regions that may have one polarization direction. Each column of regions may have a polarization direction different from polarization directions in other columns of regions.

Figure 8D:
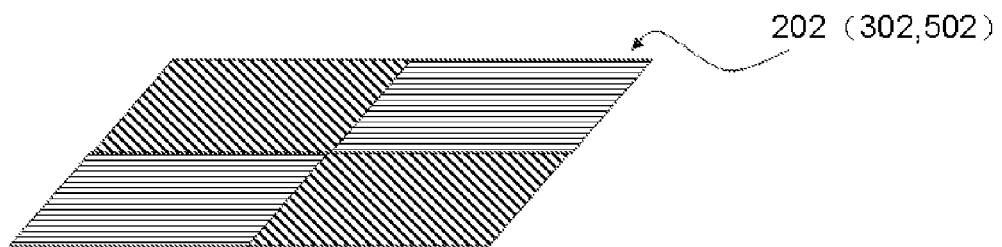
FIG. 8d illustrates a schematic view of another exemplary polarizer according to the disclosed embodiments.

FIG. 8d illustrates a schematic view of another exemplary polarizer according to the present disclosure. Referring to FIG. 8d, the polarizer may include a plurality of regions. Different regions of the polarizing layer 202, 302, or 502 may have same polarization directions, but the different regions may be arranged in a specific pattern of polarization directions. For example, the regions with different polarization directions may be arranged alternately and repeatedly, such that no neighboring regions have same polarization direction.

The size of the regions and the configuration pattern of the regions may not be limited to the various embodiments according to the present disclosure, and may be determined based on the applications and the design objectives. For the illustrative purposes, only four regions are shown in the drawings of the various embodiments. In practical applications, the regionalized polarizer may include a plurality of regions. Although the various combinations of regions are not described herein, such variations of combinations should be encompassed in the scope of the present disclosure.

Figure 9:
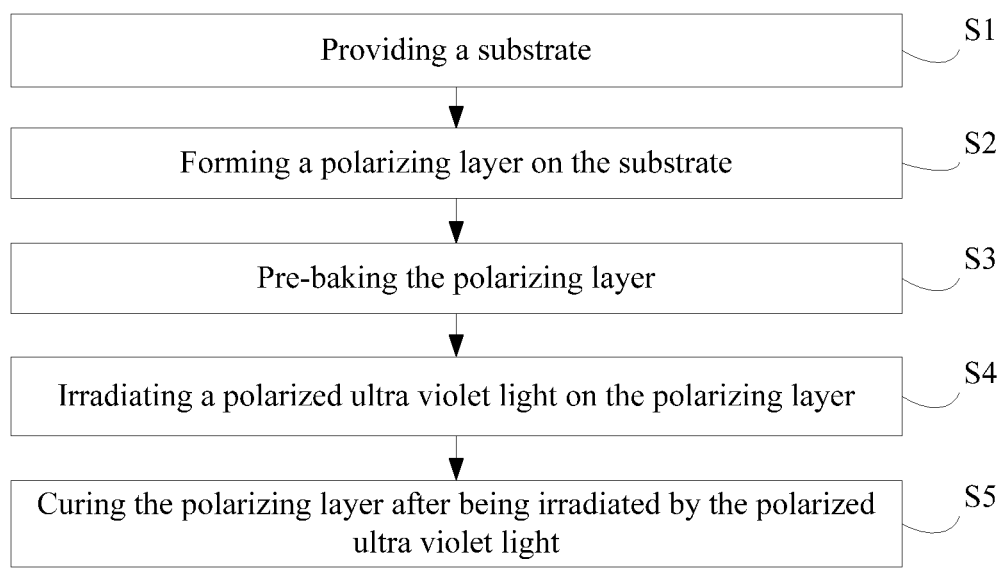
FIG. 9 illustrates a flow chart of an exemplary method of fabricating the polarizer according to the disclosed embodiments.

The present disclosure also provides a method for fabricating the regionalized polarizer. FIG. 9 illustrates a flow chart of an exemplary method for fabricating the polarizer according to the present disclosure. Referring to FIG. 9, the fabrication method may include the following steps.

Step S1: providing a substrate. Specifically, the substrate may be a rigid substrate. For example, the substrate may be made of glass. Other materials may also be used.

Step S2: forming a polarizing layer on the substrate. Specifically, a polarizing material may be coated on the surface of the substrate to form a polarizing layer. Alternatively, a polarizing material may be mixed into a base material, and the mixed polarizing material may be coated on the surface of the substrate to form a polarizing layer. The polarizing layer may be a uniform layer, or may include at least a first region and a second region. The polarizing material and the base material may be made of any one or a combination of the materials described in various embodiments.

Step S3: pre-baking the polarizing layer. Specifically, the polarizing layer may be pre-baked with the baking temperature in a range of approximately between 90° C. and 130° C., and the baking time may be approximately between 60 seconds and 120 seconds. Optionally, the baking temperature may be 130° C., and the baking time may be 120 seconds.

Step S4: irradiating a polarized ultraviolet light on the polarizing layer. Specifically, after the pre-baking process is performed on the polarizing layer, the polarizing layer is irradiated by the polarized ultraviolet light to obtain an alignment direction for the polarizing material and/or the base material. The polarized ultraviolet light may have an energy level approximately between 300 mj and 1000 mj. Optionally, the polarized ultraviolet light may have an energy level approximately between 500 mj and 800 mj, which may enable desired optical alignment capacity of the polyimide and/or desired directional alignment of the azo dye to produce desired polarization effects.

For a regionalized polarizer, the polarizing layer may include at least two regions, a first region and a second region. The first region and the second region may be irradiated by different polarized ultraviolet light with different polarization directions respectively.

For example, after irradiating the first region of the polarizing layer with a polarized ultraviolet light, the polarizing layer is rotated by a certain degrees (e.g., 90 degrees). After the rotation, the angle between the second region and the polarization direction of the polarized ultraviolet light changes. Then, the same polarized ultraviolet light is used to irradiate the second region of the polarizing layer. Because the angle between the second region and the polarization direction of the polarized ultraviolet light changed, the polarization axis direction of the second region is different from the polarization axis direction of the first region.

Alternatively, polarized ultraviolet light with different polarization directions may be obtained to irradiate the first region and the second region, respectively. The polarized ultraviolet light with a first polarization direction may be obtained by passing the ultraviolet light from the light source through a metal grating. The polarized ultraviolet light with the first polarization direction is used to irradiate the first region of the polarizing layer. Then, the metal grating is rotated by a certain degrees (e.g., 90 degrees), and the ultraviolet light from the light source passing through the rotated metal grating forms the polarized ultraviolet light with a second polarization direction. The polarized ultraviolet light with the second polarization direction is used to irradiate the second region of the polarizing layer.

In addition, a regionalized mask may be used to expose certain regions to certain polarized ultraviolet light and to shield certain other regions from the polarized ultraviolet light.

Step S5: curing the polarizing layer after being irradiated by the polarized ultraviolet light. Specifically, the polarizing layer may be cured by high temperature baking after being exposed to the polarized ultraviolet light. During the curing process, the baking temperature may be approximately between 210° C. and 230° C., and the baking time may be approximately between 20 minutes and 50 minutes. Optionally, the baking temperature may be about 230° C., and the baking time may be about 30 minutes.

Optionally, when a second polarizing layer is used, the steps S2-S5 may be repeated.

Optionally, when a quarter-wavelength thin film is formed on the polarizing layer, the process may be similar to the steps S2-S5, including forming, pre-baking, irradiating, and curing the quarter-wavelength thin film. The process may use similar parameters described in the above embodiments.

Accordingly, the regionalized polarizer according to the present disclosure may be produced through a straightforward and unsophisticated fabrication process, reducing product cost.

The disclosed regionalized polarizer may be used in camera lenses, microscopes, and other suitable optical devices.

The present disclosure also provides an optical component, such as a lens system. The optical component may include a plurality of lenses configured to produce view images. The lenses may include the disclosed polarizers to filter out the interference light more effectively to produce view images with desired clarity. In addition, the regionalized polarizer may be able to filter out the interference light by regions which may extend the usages to more practical applications.

The various embodiments described above and the certain portions of the various embodiments described above may be combined with each other without departing from the scope of the present disclosure.

The specification above provides detailed descriptions of the polarizer and the fabrication method according to the present disclosure. Various embodiments have been described to illustrate the operation principles and exemplary implementations. The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A polarizer, comprising:
a substrate made of a transparent material; and
a first polarizing layer formed on the substrate having an optical alignment direction and passing light with a polarization direction parallel to a polarization axis of the first polarizing layer after being exposed to a polarized ultraviolet light,
wherein the substrate is the only substrate in the polarizer, and no additional substrate is configured on the polarizing layer.

2. The polarizer of claim 1, wherein:
the first polarizing layer includes at least a first region and a second region; and
the first region and the second region have different polarization axis directions.

3. The polarizer of claim 1, wherein:
the first polarizing layer is made of a base material and a polarizing material doped into the base material.

4. The polarizer of claim 3, wherein:
the polarizing material is a dichroic organic dye.

5. The polarizer of claim 3, wherein:
the base material is a polyimide, a cinnamic acid derivative, or an azo-based optical alignment material.

6. The polarizer of claim 1, wherein:
the substrate is a rigid substrate.

7. The polarizer of claim 6, wherein:
the substrate is made of glass.

8. The polarizer of claim 1, further including:
a quarter-wavelength thin film formed on the first polarizing layer.

9. The polarizer of claim 8, wherein:
the quarter-wavelength thin film has a thickness approximately between 28 nm and 100 nm.

10. A polarizer, comprising:
a substrate made of a transparent material;
a first polarizing layer formed on the substrate having an optical alignment direction after being exposed to a polarized ultraviolet light and
a second polarizing layer formed on the first polarizing layer and having a polarization axis direction different from a polarization axis direction of at least one of the first region and the second region,
wherein the substrate is the only substrate in the polarizer, and no additional substrate is configured on the polarizing layer,
the first polarizing layer includes at least a first region and a second region, and
the first region and the second region have different polarization axis directions.

11. The polarizer of claim 10, wherein:
the second polarizing layer includes at least a third region and a fourth region; and
the third region and the fourth region have different polarization axis directions.

12. A method of fabricating a polarizer, comprising:
providing a substrate;
forming a first polarizing layer on the substrate;
pre-baking the first polarizing layer including at least a first region and a second region;
irradiating a polarized ultraviolet light on the first polarizing layer, wherein the first region and the second region are irradiated by the polarized ultraviolet light with different polarization directions; and
curing the first polarizing layer on the substrate to form the polarizer without adding any additional substrate on the first polarizing layer,
wherein the first polarizing layer formed on the substrate has an optical alignment direction and passes light with a polarization direction parallel to a polarization axis of the first polarizing layer after being irradiated by the polarized ultraviolet light.

13. The polarizer fabrication method of claim 12, further including:
forming a second polarizing layer on the first polarizing layer having a polarization axis direction different from a polarization axis direction of at least one of the first region and the second region.

14. The polarizer fabrication method of claim 13, wherein:
the second polarizing layer includes at least a third region and a fourth region; and
the third region and the fourth region have different polarization axis directions.

15. The polarizer fabrication method of claim 12, wherein:
the first polarizing layer is made of a base material and a polarizing material doped into the base material;
the polarizing material is a dichroic organic dye; and
the base material is a polyimide, a cinnamic acid derivative, or an azo-based optical alignment material.

16. The polarizer fabrication method of claim 12, wherein:
the substrate is a rigid substrate.

17. The polarizer of claim 16, wherein:
the substrate is made of glass.

18. The polarizer fabrication method of claim 12, further including:
forming a quarter-wavelength thin film on the polarizing layer, having a thickness approximately between 28 nm and 100 nm.

19. The polarizer fabrication method of claim 12, wherein:

the polarized ultraviolet light has an energy level approximately between 300 mj and 1000 mj;

during the pre-baking process, the baking temperature is approximately between 90° C. and 130° C., and the baking time is approximately between 60 seconds and 120 seconds; and during the curing process, the baking temperature is approximately between 210° C. and 230° C., and the baking time is approximately between 20 minutes and 50 minutes.

* * * * *